United States Patent [19]

Roberts et al.

[11] Patent Number: 4,889,730
[45] Date of Patent: Dec. 26, 1989

[54] CRISP FRUIT OR VEGETABLE SNACK PRODUCT AND PROCESS

[75] Inventors: Bruce A. Roberts, Batavia; Alice L. Burkes, Cincinnati, both of Ohio

[73] Assignee: The Procter & Gamble Company, Cincinnati, Ohio

[21] Appl. No.: 157,838

[22] Filed: Feb. 18, 1988

[51] Int. Cl.$^4$ ............................................. A23L 1/212
[52] U.S. Cl. ................................... 426/102; 426/103; 426/262; 426/285; 426/302; 426/564; 426/568; 426/570; 426/639; 426/640; 426/453; 426/456; 426/464; 426/470
[58] Field of Search ............... 426/470, 568, 564, 456, 426/464, 443, 453, 639, 640, 302, 102, 103, 285, 570, 262

[56] References Cited

U.S. PATENT DOCUMENTS

| | | | |
|---|---|---|---|
| 2,451,312 | 10/1948 | Arengo-Jones | 426/263 |
| 3,066,030 | 11/1962 | Eolkin | 426/470 |
| 3,093,488 | 6/1963 | Graham et al. | 426/470 |
| 3,170,803 | 2/1965 | Morgan et al. | 426/470 |
| 3,365,309 | 1/1968 | Pader et al. | 426/639 |
| 3,384,496 | 5/1968 | Robinson et al. | 426/512 |
| 3,698,914 | 10/1972 | Kortschat et al. | 426/470 |
| 3,833,747 | 9/1974 | Cording | 426/447 |
| 3,962,355 | 6/1976 | Yamazaki et al. | 426/639 |
| 4,246,293 | 1/1981 | Larson | 426/637 |
| 4,310,560 | 1/1982 | Doster et al. | 426/285 |
| 4,514,428 | 4/1985 | Glass et al. | 426/321 |
| 4,547,376 | 10/1985 | Silver et al. | 426/102 |
| 4,659,581 | 4/1987 | Santani et al. | 426/470 |

FOREIGN PATENT DOCUMENTS 61-265046 11/1986 Japan .
1570573 7/1980 United Kingdom .

OTHER PUBLICATIONS

Sullivan, J. F., Craig, J. C., Konstance, R. P., Egoville, M. J., Aceto, N. C., Journal of Food Science, 45 (6), pp. 1550–1555, (1980).
Strolle, E. O., Cording, J., McDowell, P. E., Eskew, R. K., Journal of Food Science, 35 (4), pp. 338–342, (1970).
Kitson, J. A., Food Technology in Australia, 25 (7), p. 366, (1973).
Taylor, Demetria, The Apple Kitchen Cookbook, International Apple Institute, p. 181, 1979, recipe for Double—A Meringue.
Perl, Lila, The Delights of Apple Cookery, New York: Coward—McCann, Inc., p. 52, recipe Fried Apple Puffs, 1963.
Goldstein, Darra, A'la Russe—A Cookbook of Russian Hospitality, Random House, New York, 1983, p. 292, recipe for Pastila—Apple Confections.

Primary Examiner—Wilbur Bascomb
Attorney, Agent, or Firm—G. R. Hatfield; R. A. Dabek; R. C. Witte

[57] ABSTRACT

Disclosed are snack products comprising a dried agglomeration of fruit or vegetable pieces as well as a method for making these snack products. This method involves utilizing a sugar soaking step to prevent the collapse and shrinkage of the individual pieces of fruit or vegetable during the drying process. The method further comprises mixing the pieces of fruit or vegetable with a foam composition prior to drying. This results in distribution of the pieces within the snack in an open mat structure so that the snack product is characterized by a ratio of solids volume to total volume of from about 0.5 to about 0.85. The final snack product has a low water activity and bulk density and provides a crisp, tender eating quality.

35 Claims, 2 Drawing Sheets

CRISP FRUIT OR VEGETABLE SNACK PRODUCT AND PROCESS

TECHNICAL FIELD

This invention relates to unique snack food products which are made from an agglomeration of fruit or vegetable pieces which are dried to a crispy state.

BACKGROUND OF THE INVENTION

In recent years a definite redefinition of what is considered to be a desirable snack food has occurred. Nutritious, wholesome, healthy snacks (e.g., those which are low calorie, low fat, and/or low salt) are becoming more and more popular.

Fresh fruit and vegetables have always been popular snack items but have the disadvantages of being somewhat inconvenient and messy to eat. Furthermore, since fruits and vegetables only stay fresh for a relatively short time, they must be purchased frequently.

Thus, there is currently a growing demand for healthy snack products which are nutritional, low in calories, fat-free or low in fat, low in salt, and which are shelf stable and convenient to eat.

Dried fruit products are well-known. Recipes teaching methods for drying fruit in the home are common. Such methods generally involve drying the product to a reduced moisture state either in an oven or in the sun. This results in soft, shrunken, rubbery pieces of fruit which have a poor eating quality. A variety of commercially dried fruit products are also available. These products are dried to moisture levels of from about 3% to about 25%.

Methods for freeze drying or vacuum drying fruit are also known. These methods can provide fruit products which are dried to a firm cripsy state. One method for producing crisp, dry fruit products involves an explosion-puffing system such as that described in Sullivan et al., Journal of Food Science, 45(6), 1550-1555 (1980). The explosion-puffing is carried out at an elevated pressure and in a stream of super-heated steam. The water in partially dried fruit pieces is rapidly brought to a temperature above its atmospheric boiling point. When the pieces are instantly returned to atmospheric pressure, a fraction of the water flashes into steam, creating a porous structure. After being puffed, the fruit pieces are dried by conventional means to 3% moisture or less. The explosion-puffing restores the partially dried, concave, case-hardened fruit pieces to their normal size and shape but with a porous structure. A problem with this method is that the product produced is particularly susceptible to losing its crispness over a short period of time.

An alternative method for producing crisp, dry fruit products involves drying the product first in a conventional hot air dryer, then frying in oil, and finally, expanding by vacuum to produce a porous hardened snack. Such a method is disclosed in U.S. Pat. No. 3,962,355, Yamazaki et al., issued June 8, 1976. These products might be considered undesirable because of their high-oil content; in addition, the oil in the product tends to go rancid after extended periods of storage.

Strolle et al., Journal of Food Science, 35(4), 338-342 (1970), suggests a solution to the problem of the instability of the crispy texture of explosion-puffed fruit pieces. The improvement involves replacing most of the monosaccharides found naturally in the fruit with sucrose which has a much higher softening temperature in the amorphous glass state. See also U.S. Pat. No. 3,833,747, Cording et al., issued Sept. 3, 1974. Similarly, U.S. Pat. No. 4,514,428, Glass et al., issued Apr. 30, 1985, covers a fruit snack product which is made by thinly slicing apples on the cross section and steeping the apples in a sugar solution prior to rapid drying. This produces a crisp dry apple slice. U.S. Pat. No. 3,962,355, supra, also utilizes a method wherein a sucrose soaking step is used prior to vacuum frying to produce a porous hardened snack.

Weight Watchers Apple Snack®, marketed by Weight Watchers Inc., is a snack product in the form of crisply dried, firm, apple cubes. This product has a very low $A_W$, a low density, a light airy structure, and has no added fat or sugar. However, an undesirable characteristic of this product is observed upon eating. As the product is chewed and the structure is rehydrated, it becomes somewhat gummy and sticky.

Fruit products which include meringue are also known; see, for example, a recipe for Apple Snow from the *Wise Encyclopedia of Cookery*, New York: Grossett and Dunlap, 1980, page 21. Here beaten egg whites, baked apple which has been run through a sieve, and powdered sugar are combined. This product is served as and is not baked and dried. A recipe for Apple Confections from Goldstein, Darra, *A La Russe/A Cookbook of Russian Hospitaity*, New York: Random House (1983), page 292, discloses a confection comprising a mixture of steamed pureed apple, lemon juice, sugar, flavoring, and stiffly beaten egg white, which is baked in a slow oven (150° F.) until dry (about 6 hours). A recipe for Double-A-Meringue from Taylor, Demetria, *Apple Kitchen Cook Book*, International Apple Institute, 1979, page 181, discloses a baked dessert comprising sliced apples, sugar and meringue. In this product the meringue is placed on top of the layered sliced apples, not mixed in with the apples.

Products comprising fruit shreds are also known in the art. Dried fruits in the form of shreds having various moisture levels are commercially available. These products do not, however, include sugar and meringue. One recipe for Apple Puffs (Perl, Lila, *The Delights of Apple Cookery*, New York: Coward-McCann, Inc., 1963, page 52) teaches the combination of shredded apple with stiffly beaten egg white, sugar, cinnamon and a relatively high level of flour. Tablespoonsful of the mixture are then dropped onto a hot, well-greased griddle and "fried" until golden brown. These Apple Puffs have a relatively high $A_W$ and are cooked by frying on a griddle, rather than being dried.

A variety of dried vegetable products are also known. Potato chips, comprising potato slices which have been cooked to a very crisp state by frying in oil, are a very popular snack item. However, these snacks are generally relatively high in fat and salt content. Freeze dried vegetables are also known, but are generally not considered to be particularly desirable snack food items.

The art does not describe fruit or vegetable-based snack products, as taught herein, which are light and crispy in texture, are low in calories, fat and salt, and which comprise an agglomeration of subdivided pieces of fruit or vegetable.

It is therefore an objective of the present invention to provide a nutritious, wholesome, low calorie, low- or no-fat, low-salt snack product comprised of dried fruit or vegetable pieces.

It is a further objective to provide a fruit- or vegetable-based snack product that is formulated so as to be convenient, easy to eat, and shelf stable for extended periods of time.

It is a further objective to provide a fruit- or vegetablebased snack product that is good tasting, light and crispy, and which disperses easily in the mouth upon chewing.

It is yet a further objective to provide a method for making a fruit- or vegetable-based snack product with these unique attributes.

SUMMARY OF THE INVENTION

The present invention relates to a method for making a crisp, dried snack product which comprises:
 (a) removing undesirable parts from whole pieces of edible plant matter;
 (b) subdividing said pieces of plant matter into smaller pieces (e.g., having a cross-sectional thickness in at least one dimension of from about 1 mm to about 2 mm);
 (c) pretreating said pieces with sugar until said pieces absorb from about 5% to about 25% of sugar by weight of said pieces;
 (d) draining said pretreated pieces until dewatered;
 (e) combining said pieces with a foam composition comprised of from about 1.5% to about 8% of a foaming agent, from about 0.5% to about 6% of a foam thickening agent, from about 5% to about 55% of a sugar component, and from about 45% to about 90% of water, so that the pieces to foam ratio is from about 2 to about 9;
 (f) forming said combination into the desired shaped product; and
 (g) drying said product at a temperature of from about 75° C. to about 120° C. for from about 60 minutes to about 250 minutes to a water activity of from about 0.05 to about 0.3 and a bulk density of from about 0.2 to about 0.6 so that said pieces substantially retain their original volume and said pieces are positioned with respect to one another in an open mat structure such that the snack product is characterized by a ratio of solids volume to total volume of from about 0.5 to about 0.85.

The present invention also relates to a snack product having a water activity of from about 0.05 to about 0.3 and a bulk density of from about 0.2 to about 0.6, which comprises:
 (a) from about 40% to about 70% subdivided pieces of edible dried fruit or vegetable;
 (b) from about 5% to about 50% added sugar absorbed into said subdivided pieces; and
 (c) from about 10% to about 40% of a collapsed foam coating the exterior of said pieces;
wherein said pieces substantially retain their original volume and said pieces are positioned with respect to one another in an open mat structure such that the snack product is characterized by a ratio of solids volume to total volume of from about 0.5 to about 0.85.

A preferred snack product comprises:
 (a) from about 4% to about 7% dried shredded apple, carrot or beet;
 (b) from about 5% to about 60% added sugar absorbed into the vegetable matter;
 (c) from about 5% to about 40% added sugar coating the exterior of the shredded vegetable matter;
 (d) from about 2% to about 10% egg white solids coating the exterior of the shredded vegetable matter;
 (e) from about 1% to about 6% polyglycerol esters coating the exterior of the shredded vegetable matter; and
 (f) from about 2% to about 10% pregelatinized starch coating the exterior of the shredded vegetable matter.

DETAILED DESCRIPTION OF THE INVENTION

Fruit or Vegetable Component

Figure 1:
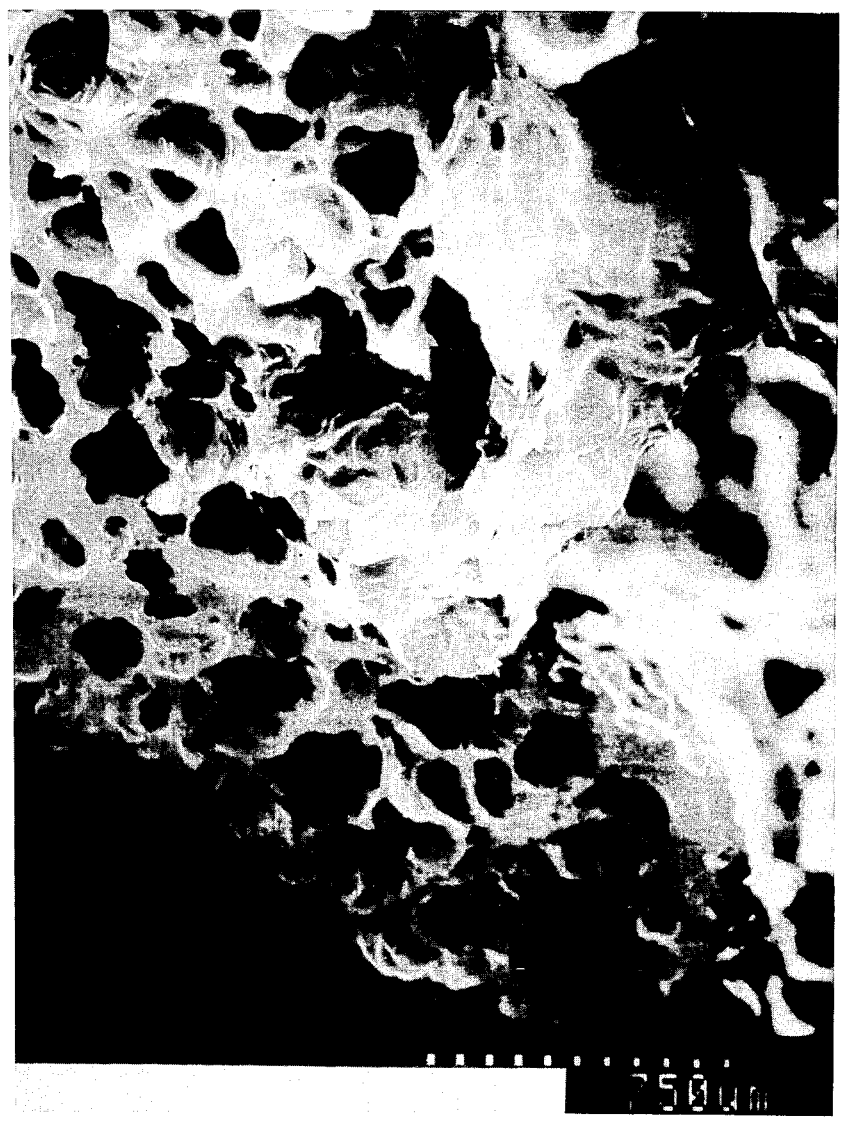
FIG. 1 is a photomicrograph (80X) of the internal structure of an individual apple shred taken from a dried snack product of the present invention.

The snack products of the present invention may be prepared from any edible plant food matter, preferably any fruit, or vegetable. It has, however, been determined that some fruits and vegetables are more preferred in the present invention than others. Particularly, fruits and vegetables that substantially retain their original volume during dehydration (such as apples, carrots, and beets) are useful.

Apples are the preferred fruit for use in the present invention. Without wishing to be bound by theory it is believed that the apple products of the present invention substantially retain their original volume throughout dehydration due, at least in part, to the existence of air vacules which occur naturally in the intercellular structure of the apple. Any variety of apple will work in the present invention. However, processing grade apples, such as Golden Delicious, Northern Spy, Ida Red, Granny Smith, and Rome, are preferred.

The preferred vegetables used in the present invention are carrots and beets. Without wishing to be bound by theory, it is believed that these two vegetables substantially retain their original volume during dehydration due to the strength of their cell walls.

A combination of different varieties of plant matter may also be used to make the products of the present invention. For example, beet and onion mixtures may be used.

Additionally, a type of plant matter may be used in the present invention which acts simply to supply structure to the product without imparting any flavor. A variety of different flavors could be added to such a carrier substance to provide snack products as are herein disclosed. This carrier substance might comprise, for example, processed sugar beet pulp. Such beet material consists of the sugar beet bulk after the sugar has been removed. This material would provide a very economical vehicle for creating the products of the present invention. Mixtures of any or all of the above described fruits or vegetables may also be used.

The products of the present invention are made by first removing any undesirable parts from the fruit or vegetable. This may involve peeling and/or coring. This can be done manually on a small scale, or on a larger scale, for example with an Atlas Pacific peeler.

The remaining fruit or vegetable matter is then subdivided into pieces. These pieces may be of a variety of shapes, for example, cubes, slices, chips, strings or grated pieces. Preferably, in at least one dimension the distance from the center of the piece to the surface is no greater than about 2 mm. The pieces preferably consist of shreds. The shredding may be done, for example, with an Osterizer ® or Cuisinart ® food processor or a small scale, or, on a larger scale with, for example, an Urshel CC slicer with an oval cut shred head. Differences in equipment used may have some effect on the texture of the shred pieces which will, in turn, affect the final product somewhat.

Regardless of which equipment is used to create the shreds, the typical shred length should be between about 2 cm and about 5 cm, preferably, about 3 cm. A shred length smaller than about 2 cm results in shred packing in the product which is too dense. A shred length greater than about 5 cm results in difficulty in forming the product. The shred diameter or width should preferably be between about 1 mm and about 4 mm so that the distance from the center to the surface at the width is no greater than about 2 mm, preferably from between about 1 mm to about 2 mm.

From about 40% to about 70% of the final dried snack products of the present invention comprise these subdivided pieces of fruit or vegetable.

The subdivided pieces are first pretreated with sugar to allow the pieces to absorb the sugar. The sugars used in this step are to be distinguished from the sugars naturally present in fruit or vegetable material. For example, an apple naturally comprises about 12% apple sugars such as fructose and sucrose. However, these natural apple sugars do not, alone, prevent the apple cellular structure from collapsing during dehydration. The purpose of this sugar absorption step is to allow the fruit or vegetable pieces to absorb additional sugar so as to replace or supplement the sugars naturally present with added sugars. By absorbed added sugars is meant sugars which substantially enter the interior of the shred and occupy the spaces between as well as the interior of the individual apple cells. The presence of these added sugars helps to retain the original volume of the individual pieces of fruit or vegetable during the drying process, i.e., the added sugars substantially prevent collapse of the structure of the individual pieces of fruit or vegetable during dehydration. FIG. 1 shows the internal structure of a pretreated apple shred after dehydration. It can be seen that the apple shred substantially retains its original volume. A manifestation of this maintenance of shred structure can be seen in product volume. For example, a product of the present invention which is about ⅜ inch thick prior to dehydration, may still be about ¼ inch thick after dehydration.

Preferably this pretreatment step comprises soaking the pieces in an aqueous sugar solution. Any crystallizing or noncrystallizing commercially available sugar may be used in this step. Crystalline monosaccharides, such as glucose, which is available from A. E. Staley Manufacturing Company, and fructose, which is available from Suddentsche Zucker-Aktiengesellschaft Mannheim, will work. Disaccharides, such as maltose, available as maltose monohydrate from Sigma Chemical Company, will also work, as will tri- and higher saccharides, e.g., available as Maltrin M205 ® from Grain Processing Company.

Corn syrups which comprise a mixture of mono-, di-, tri-, tetra-, and higher saccharides may be used instead of, or in addition to, the crystallizing sugars, with a slight adjustment to the level of water in the solution. Fruit juice concentrates or isolated fruit sugars may also be used. If the sugar used is sucrose, from about 5% to about 50% sugar, preferably about 30% sugar on a dry solids basis is used in solution. The amount of alternative sugars used is essentially the same, however, variations in sweetness intensity and sweetness profile between different sugars may be noticed and adjusted for.

The weight ratio of pieces of fruit or vegetable to solution in this soaking step should be from about 1:1 to about 1:4. The soaking may be done at room temperature and preferably the mixture is stirred intermittently to avoid localized depletion of sugar. The soaking may be done in an appropriately sized stainless steel or food grade plastic container. The soaking is continued until the pieces of fruit or vegetable absorb from about 5% to about 25% sugar by weight of the pretreated pieces. Generally this can be accomplished by soaking for from about 15 minutes to about 2 hours at room temperature (e.g., from about 4° C. to about 35° C.), preferably from about 10 to about 60 minutes, most preferably for about 45 minutes. Alternatively, soaking may be done for several days in refrigeration. In general, soaking time for pieces of subdivided fruit or vegetable that have been cut with equipment than results in very smooth edges may be somewhat longer than pieces cut by equipment resulting in frayed edges.

If a fruit or vegetable which tends to discolor upon exposure to air is used in the present invention, the subdivided pieces are also preferably pre-treated to prevent browning. This pretreatment is especially useful with apples and may be accomplished by soaking the pieces in an aqueous solution containing an anti-browning agent such as ascorbic acid. From about 0.75% to about 3%, preferably about 2%, of the solution should comprise ascorbic acid. Alternatively, ascorbic acid and citric acid may be used together in a ratio of 2 parts citric acid to 1 part ascorbic acid. In this case from about 0.5% to about 2.5%, preferably about 1.5%, of the solution should comprise these anti-browning agents. Alternatively, an aqueous solution containing from about 0.5% to about 2.5% of a mixture comprising 6 parts citric acid, 3 parts ascorbic acid, and 0.5 parts calcium chloride may be used. Sulfur dioxide is yet another color stabilizer which may be used in the present invention in an amount equal to 10 ppm of the solution. This anti-browning step may be done prior to or simultaneously with the sugar soaking step by adding the anti-browning agent to the sugar solution prior to soaking the pieces therein.

A snack product of the present invention which contains some fat may also be made by adding an edible oil to the pretreatment solution. From about 2% to about 15% of the pretreatment solution may comprise the oil. This amount can be varied depending upon the fat content desired in the final snack product. Though any edible oil may be used, vegetable oils such as Crisco ® brand oil, or peanut oil, or other nut based oils, are preferably used. The addition of oil in this pretreatment step allows the fruit or vegetable to absorb some oil during the soaking process. Generally this will result in from about 2% to about 30% fat in the final dried snack product. Addition of a fat component to the snack product gives the final product a better mouthfeel and richer flavor. However, fat is not required to make the snack products of the present invention.

Flavor additives may also be included in the pretreatment solution. These may comprise fruit flavors such as apple, cherry, grape or blueberry or nut flavors such as peanut, almond, walnut or pecan. Food dyes may also be added to the pretreatment solution to alter the color of the final product.

After soaking, the fruit or vegetable pieces are drained and their surfaces dewatered. This may be accomplished using an aspirating device, such as a vacuum filter or Buchner funnel. Alternatively, a basket centrifuge may be used. By "dewatering" is meant draining until negligible free solution remains on the surface of the pieces. Preferably, a dewatered piece of fruit or vegetable comprises no more than about 85% water (i.e., no more water than it would typically contain in its natural state).

Alternatively, this pretreatment step may comprise direct sugaring of the pieces of fruit or vegetable. This may be accomplished by simply thoroughly mixing the subdivided pieces of fruit or vegetable with an undiluted sugar (in dry or syrup form) and allowing the combination to stand for from about 4 to about 48 hours. The pieces of fruit or vegetables should be combined with the sugar at a ratio of pieces to sugar of from about 10:1 to about 4:1. Ascorbic acid or other anti-browning agents may also be utilized in this alternative pretreatment step by adding the agent in the initial mixing step. After the appropriate standing time has passed, the fruit or vegetable pieces are dewatered as above, since the direct sugaring tends to draw water that is naturally present in the fruit or vegetable pieces to the surface.

Regardless of which pretreatment step is utilized, preferably from about 5% to about 25% of the pieces comprise added sugars taken up by the pieces of fruit or vegetable during the pretreatment. Preferably, these added sugars are absorbed into the pieces, though a small portion of the so-called absorbed sugars may coat the exterior of the pieces.

Foam Composition

In addition to the subdivided pieces of fruit or vegetable, the present invention comprises a foam. This foam comprises a foaming agent, a foam thickening agent, sugar, and water. This foam is admixed with the pieces of fruit or vegetable prior to dehydration of the product. Utilization of the foam in the products of the present invention makes shaping these products into their final form easier. The foam works, essentially, to hold the pieces of fruit or vegetable together. The foam also plays a role in creating the light airy texture of the final product. During dehydration of the product the foam seems to disappear. Actually, the foam changes in form as it dries so that in the final product it is no longer visible in the spaces between pieces of plant matter. As the foam dehydrates, it collapses and the foam components form a coating on the pieces of fruit or vegetable. By "coating" is meant a glass-like structure form of the foam distributed on and between the pieces of fruit or vegetable. This "glass-like" collapsed foam holds the pieces of fruit or vegetable together in an aggregate mass during dehydration; it also holds the pieces somewhat apart from one another so that they do not collapse together while drying. The "glass-like" collapsed foam does not fill all of the spaces between pieces of fruit or vegetable. Indeed, the products of the present invention, in general, show a ratio of solids volume to total volume of from about 0.5 to about 0.85, preferably from about 0.55 to about 0.7. The solids volume is organized in the total volume of the snack in a random network with open spaces dispersed therein. This interior structure can be described as a random open mat structure.

The ratio of solids volume to total volume can be measured as follows. A Castolite® polyester resin is poured over a whole snack product while a vacuum is applied to remove trapped air from the voids within the snack. Cross-sectional slices about 1 mm thick are then cut through the encased snack. Image analysis is then used to measure the areas occupied by solid pieces of snack and the total cross-sectional area of the cut pieces of snack. This is done for several cross sectional slices of the snack so that an average value for the ratio of solids volume to total volume of the snack product can be calculated.

Figure 2:
FIG. 2 is a photograph (4X) of a cross-sectional slice taken from a dried snack product (embedded in a polyester resin) of the present invention.

FIG. 2 is a photograph of a cross-sectional slice of a dehydrated piece of an agglomeration of apple shred and foam prepared as described above. Maintenance of spaces between shreds can be seen. Also, it can be seen that the open spaces and shreds are spread out over the cross-sectional area of the piece of product in a random fashion.

Without wishing to be bound by theory, it is believed that this structure gives the final product its light, airy, crispy texture. As one bites down on the snack product, both crispness and tenderness are noted. This is because a cut made in any direction in the snack product meets with a series of pieces of dried fruit or vegetable and open spaces. Thus, the force needed to bite through the product is broken intermittently by open space. The products of the present invention have a crisp but tender eating quality that is not seen in conventional dried fruit and vegetable products.

The foam used in the present invention comprises any conventional foaming agent. Preferably, egg white solids are used. Alternatively, other protein foaming substances, such as whey protein isolate, vegetable protein such as soybean protein isolate, or gelatin, may be used. The egg white solids, or substitute, comprises from about 1.5% to about 8%, preferably about 3%, of the foam composition. Polyglycerol ester (PGE) or Quailla bark extract may be substituted as alternative foaming agents. Preferably, 3 parts egg white solids to 1 part PGE is used as the foaming agent.

In addition to the foaming agent, the foam composition comprises a thickening agent. This component allows the foam to whip-up more easily. Preferably the thickener is pregelatinized starch. Any of the common food starches, for example, potato starch, corn starch, wheat starch, rice starch, barley starch, oat starch, tapioca starch, arrowroot and sago starch may be used. Modified starches may also be used. From about 0.5% to about 6%, preferably from about 1% to about 4%, of the thickening agent is used. Amaizo 721A brand pregelatinized starch available from A. E. Staley Co. is preferred.

In addition, sugar comprises from about 5% to about 55% of the foam composition. As with the sugar in the soaking step, any type of sugar may be used. However, this sugar is to be distinguished from the natural sugars in the fruit or vegetable matter and the sugar taken up by the pieces of fruit or vegetable in the sugar soaking step. The sugar added via the foam composition is dispersed in the spaces between and coats the exterior of the pieces of fruit or vegetable (along with the starch and protein of the foam composition) and, as discussed supra, forms a "sugar glass" during dehydration, which maintains open spaces between the pieces of fruit or vegetable in the final product.

Optionally, carboxymethylcellulose (CMC) may comprise from about 0.2% to about 1.5%, preferably about 0.7%, of the foam composition. Alternatively, other viscosity controllers such as alginates or xanthan gums may be used. Guar gums or other hydrocolloids may also be substituted for the CMC.

Water comprises from about 45% to about 90% of the foam composition. An amount of water less than this affects the functionality of the foam composition during dehydration. An amount of water greater than this weakens the structure of the foam.

Snack products of the present invention may also be made in which peanut butter paste is mixed into the prepared foam component. By "peanut butter paste" is meant, for example, defatted ground peanuts, containing from about 12% to about 20% fat. This is an alternative method to putting oil in the pretreatment step for introducing fat into the snack product. Generally the paste is introduced into the foam at a ratio of paste to foam of from about 1:5 to about 1:3 (by weight). Utilization of peanut butter paste in the foam results in a final snack product with a fat content of from about 5% to about 20% by weight.

Flavors or dyes may also be added to the foam composition.

Preferably, the foam is prepared in three steps. First, the thickening agent, sugar, and, if desired, the CMC, are hydrated. Next, the foaming agent is hydrated and allowed to stand for about 5 minutes. The ingredients are then combined and whipped at high speed until a foam density of from about 0.05 to about 0.38, preferably about 0.23, is attained. On a small scale, an Osterizer ® or Kitchen Aid ® mixer can be used. On a larger scale, a Hobart Mixer equipped with a whip unit may be used.

The pieces of fruit or vegetable and the foam are combined and mixed to incorporation by folding the pieces into the foam, for example, by hand or with a ribbon blender or twin sigmoid blade mixer (e.g., a Peerless ® mixer). The pieces and the foam are combined in a ratio, of pieces to foam, of from about 2:1 to about 9:1.

The final dried snack product comprises from about 10% to about 40% of the collapsed foam. The collapsed foam in turn comprises from about 10% to about 30% of the dried foaming agent, from about 10% to about 30% of the dried thickening agent, and from about 40% to about 80% dried sugar. These components coat the exterior of and occupy part of the spaces between the pieces of dried fruit or vegetable.

Alternatively, the foam component may comprise from about 40% to about 100% of a fat-containing dairy-based or dairy-like whipped topping composition such as whipped cream or one of several commercially available whipped cream substitutes. Examples include Reddi-Whip ® topping marketed by Beatrice Cheese, Inc. Waukesha, Wis.; La Creme ® topping available from Pet, Inc., St. Louis, Mo.; Cool Whip ® topping available from General Foods Corp., White Plains, N.Y.; Lucky Whip ®topping available from Aroset Foods, Div. Anderson, Clayton and Co., Oakland, Calif.; or Dream Whip ® topping (prepared from dry mix) available from General Foods Corp., White Plains, N.Y.

These latter products generally contain from about 20% to about 25% of a fat component; from about 10% to about 30% sugar; from about 1% to about 3% of an emulsifier, and from about 45% to about 65% water. Thus, snack products made with this alternative "foam component" will contain from about 10% to about 35% fat.

These alternative foam compositions are combined with the pieces of fruit or vegetable in the same ratio of pieces to foam as is used with the foam compositions as described supra, i.e., from about 2:1 to about 9:1.

A variety of additional components can be added to this composition at art-established levels prior to shaping and dehydrating. Additives may of a type that remains as whole pieces in the snack product. Such additives include, but are not limited to, fruit or fruit-flavored bits, such as blueberry, strawberry, citrus or other flavored bits. These may be, for example, natural fruit bits or artificially flavored fruit bits, such as those disclosed in U.S. Pat. No. 3,794,741, Weigle, issued Feb. 26, 1974, which is herein incorporated by reference; nutmeats including the whole, chopped, or ground meat of any edible nut including walnut, black walnut, hickory nut, hazel nut, brazil nut, peanut, macadamia nut, pecan, almond, cashew, coconut and the like; grains including oatmeal, wheat or rye; real cheese or cheese flavored bits; or chocolate, peanut butter or butterscotch chips or chunks.

Other components may be incorporated at their art established levels prior to shaping and dehydrating to add flavor, aroma, and color to the final product. For example, spices such as cinnamon, mace, nutmeg, caraway, anise, allspice, poppy seed, coriander, ginger, cloves, fennel, garlic, basil, oregano, tarragon, salt and the like; and flavorings, such as banana, apple, orange, lemon, mint, vanilla and the like, may be added.

The amount of any of these flavoring components added (whether they are of the type which remain as whole pieces or of the type that are blended into the composition) depends on personal preference, on the type of product being formulated, and on what particular components are being added; such amounts may easily be chosen by one skilled in the art.

The combined pieces of plant matter, foam and, if desired, other additives, are then shaped into the final product. This can be accomplished by shaping the product by hand or by using a mold. A plexiglass sheet mold that has holes cut out equal to the size of the desired product may be used to shape the product into, for example, flat round discs. The wet foam/plant matter composition, in an amount sufficient to fill the hole, is placed in the hole and spread to the shape of the hole. Alternatively, the final product could be shaped with a Beepex-Hutt extruder and cut into flat discs.

Preferably, the thin flat disc form of product has a diameter of from about 3 cm to about 6 cm and a typical thickness of from about 0.5 cm to about 2 cm.

An alternative preferred shape is produced by forming the fruit or vegetable/foam composition into bite-sized balls (approximately spherical in shape) having a diameter of from about 1 cm to about 2.5 cm. This can be accomplished by hand by scooping a desired amount of the composition with an appropriately sized scoop. Any other product shapes may also be used which result in a product with the parameters as described herein. For example, the shape may be pie, bar, doughnut, or spiral, among others.

The shaped product is then placed on a baking sheet, preferably, an aluminum Teflon ® coated perforated sheet. Preferably the perforations are 0.64 cm holes on 0.95 cm centers. Most preferably, a second Teflon ® coated sheet is placed on top of the product in the case of product shaped as discs. (This second screen is not necessary in the case of ball-shaped product and may not be necessary in the case of the disc shaped product if, for example, it is made by beginning with a ball shaped product, dehydrating it partially, then flattening it into a disc and completely dehydration).

The product is then dehydrated. This may be accomplished in a convection, conventional, or convection/microwave oven. The drying temperature is from about 75° C. to about 120° C., preferably about 110° C. The drying time is from about 60 minutes to about 250 minutes depending on the type of oven used, the temperature and the product shape. The product is dried to a moisture content of from about 1% to about 5%, then removed to a rack to cool. This final product has an $A_w$ of from about 0.05 to about 0.3, preferably from about 0.08 to about 0.15, and a bulk density of from about 0.2 to about 0.6. As used herein, bulk density refers to the density of the product. This density may be measured, for example, by the glass bead method using 1-2 mm beads. The pieces of fruit or vegetable in the product are positioned with respect to one another in a random open mat structure such that the snack product is characterized by a ratio of solids volume to total volume of from about 0.5 to about 0.85.

A variation on the disc shaped product may be prepared by placing an edible filling between two discs thus creating a "sandwich" type of snack. This filling can be, for example, a frosting, a fruit filling, a cheese filling or a nut paste filling, among others. Preferably the filling is oil-based so as to prevent absorption of moisture into the discs.

The resulting dried snack product of the present invention has a water activity of from about 0.05 to about 0.3, preferably about 0.1, and a bulk density of from about 0.2 to about 0.6, preferably about 0.55, and comprises from about 40% to about 70% subdivided pieces of dried edible plant matter; from about 5% to about 50% added sugar absorbed into said subdivided pieces; and from about 10% to about 40% of a collapsed foam coating the exterior of said pieces; wherein said pieces substantially retain their original volume and said pieces are positioned with respect to one another in a random open mat structure such that the snack product has a ratio of solids volume to total volume of from about 0.5 to about 0.85.

Preferably, the added sugar comprises sucrose. The collapsed foam preferably comprises from about 5% to about 30% of egg white solids, from about 5% to about 30% of pregelatinized starch, from about 1% to about 12% of polyglycerol ester, and from about 30% to about 89% sucrose.

The following examples illustrate the present invention. It will be appreciated that other modifications of the present invention, within the skill of those in the snack food art, can be undertaken without departing from the spirit and scope of this invention.

All percentages and ratios herein are by weight unless otherwise indicated.

EXAMPLE I

Flat disc shaped dried apple snacks are prepared by the following method. Red Delicious apples are first cored and shredded with a Cuisinart ® food processor to shreds that are about 4 mm in diameter and about 3 cm in length. The shredded apple is then pretreated by placing in a solution containing 2.0% ascorbic acid (J. T. Baker Chemical Company) and 30% sucrose (Kroger) for 45 minutes. The ratio of apple shreds to solution is about 1:2. The apples are drained from the solution by use of a vacuum filter until negligible free solution remains on the surface of the shreds. The shredded apple is then combined with a foam component at a ratio by weight of shredded apple to foam of 8:2.

| Foam Composition | |
|---|---|
| Ingredient | Wt. % |
| Egg White Solids (Balcus) | 3 |
| Pregelatinized Starch (Amaizo 721 A, A. E. Staley Co.) | 2 |
| Carboxymethylcellulose (Hercules) | 0.7 |
| Sucrose (Kroger Brand) | 10 |
| Water | 84.3 |
| | 100% |

The foam component is prepared by first mixing the starch, CMC, and sucrose, then dispersing in water. An Osterizer ® may be utilized to obtain a smooth uniform mixture. The egg white solids are then added and the combination is whipped with a Kitchen Home Center (Oster Regency) at speed 8 for about 3 minutes until a foam develops. The speed is then increased to speed 11 and the combination is mixed for an additional 4 minutes or until the density of the formed foam is about 0.25.

Four hundred (400) grams of the drained apples are combined with one hundred (100) grams of the prepared foam and mixed to incorporation. A plexiglass mold is then placed onto a Teflon ® coated aluminum perforated baking sheet with 0.64 cm holes on 0.95 cm centers. Approximate teaspoonsful of the apple/foam mixture are placed into the holes and formed into 3.8 cm circles. The plexiglass mold is removed and a second perforated baking sheet is placed over the products. The products are dehydrated in a convection oven (Blue-M-Oven) for about 2½ hours at 110° C. The snacks are removed to a rack to cool.

The final apple snack discs have an $A_w$ of about 0.08, and a bulk density of about 0.3. The apple shreds in the disc are positioned therein in a random uncollapsed open mat structure with a ratio of solids volume to total volume of about 0.55, which provides the product with a crisp, tender eating quality.

EXAMPLE II

Apple snacks are prepared by the method of Example I but the pretreated apple shreds are combined with a dairy-based or dairy-like whipped topping product, such as Reddi-Whip ® topping which is marketed by Beatrice Cheese, Inc., instead of the egg white based foam. The ratio of shreds to Reddi-Whip ® is about 2.8 to 1. The product is formed as in Example I and dehydrated in a convection oven (Blue-M-Oven) for about 2 hours and 50 minutes at 110° C.

The final apple snack discs have in $A_w$ of about 0.10, and a bulk density of about 0.32. The apple shreds in the disc are positioned therein in a random uncollapsed open mat structure with a ratio of solids volume to total volume of about 0.55, which provides the product with a crisp, tender eating quality.

Substantially similar results are obtained if the Reddi-Whip is replaced with La Creme ® topping available from Pet, Inc., St. Louis, Mo.; Cool Whip ® topping available from General Foods Corp., White Plains, N.Y.; Lucky Whip ® topping available from Aroset Foods, Div. Anderson, Clayton and Co., Oakland, Calif.; Dream Whip ® topping (prepared from dry mix) available from General Foods Corp., White Plains, N.Y.; or real whipped cream.

EXAMPLE III

Apple snacks are prepared by the method described in Example I, with the exception that pretreating by direct sugaring is used instead of the pretreating soaking step.

| Ingredient | Wt. % |
| --- | --- |
| Shredded Apple | 81 |
| Sucrose | 17.5 |
| Ascorbic Acid | 1.5 |

The above ingredients are combined and allowed to stand for 4 to 48 hours. The excess fluid is then removed by partial drying to a level of about 70 to 75% water. The pretreated shreds are then combined with the foam component and dried as in Example I.

Substantially similar results are obtained if the sucrose is replaced, in whole or in part, with glucose, fructose, maltose, corn syrups, fruit juice concentrates, or isolate fruit sugars.

EXAMPLE IV

Ball-shaped dried apple snack products are prepared by the method of Example I except that the "wet" foam/shred composition is shaped into balls using a size 100 cookie scoop. The balls are placed onto a Teflon ® coated, perforated screen (a second screen is not needed). The products are dehydrated in a convection oven (Blue-M-Oven) for about 2 hours at 110° C. The snack products are removed to a rack to cool.

The final apple snack balls have an $A_w$ of about 0.10, and a bulk density of about 0.32. The apple shreds in each ball are positioned therein in a random uncollapsed open mat structure with a ratio of solids volume to total volume of about 0.55, which provides the product with a crisp, tender eating quality.

These ball-shaped snacks can also be made with a caramel coating as described below. The caramel coating is first prepared as follows.

| Ingredient | Wt. % |
| --- | --- |
| Salted Margarine (Corn oil) | 11.40 |
| Granulated Sugar | 20.40 |
| Light Brown Sugar | 44.20 |
| Water | 23.94 |
| Salt | 0.02 |
| Vanilla Flavoring | 0.04 |
|  | 100.00 |

The margarine is melted in a heavy pan and the sugar and water are stirred in until well mixed. The composition is heated, without stirring, to 275° F.(135° C.). The sides of the pan are brushed down while heating with a pastry brush to prevent sugar crystal formation on the sides of the pan. The pan is removed from the heat and the salt and vanilla are stirred in. The dried, ball-shaped apple snack products of Example IV are tossed with the syrup mixture at a ratio of dried snack to syrup of 30:70, until thoroughly coated. The syrup-coated snack is then spread on a shallow pan lined with waxed paper to cool. The snack pieces are broken apart and stored in a tightly sealed container.

EXAMPLE V

Flat, disc shaped dried carrot snacks are prepared by the method of Example I by substituting carrot shreds for the apple shreds (prepared from carrots which have been shaved with a knife to remove the outer "peel"). The carrot shreds are soaked overnight in a sucrose/ascorbic acid aqueous solution containing 2.5% ascorbic acid and 15% sucrose. The product is combined with foam as prepared in Example I and shaped and dried as done in Example I.

The final carrot snack discs have an $A_w$ of about 0.10, and a bulk density of about 0.4. The carrot shreds in the disc are positioned therein in a random uncollapsed open mat structure with a ratio of solids volume to total volume of about 0.6, which provides the product with a crisp, tender eating quality.

EXAMPLE VI

Flat, disc shaped dried beet snacks are prepared by the method of Example V by substituting beet shreds for the carrot shreds (prepared from beets which have been peeled). Alternatively, a combination of beet and onion pieces may be used. The final beet snack discs have an $A_w$ of about 0.10, and a bulk density of about 0.35. The beet (or beet and onion) shreds in the disc are positioned therein in a random uncollapsed open mat structure with a ratio of solids volume to total volume of about 0.65, which provides the product with a crisp, tender eating quality.

EXAMPLE VII

Apple snacks are prepared by the following method. A pretreatment solution is prepared by combining the following ingredients and mixing until dissolved.

| Pretreatment Solution | |
| --- | --- |
| Ingredient | Wt. % |
| Ascorbic Acid (J. T. Baker Chemical Co.) | 0.8 |
| Sucrose | 24.4 |
| Egg White Solids | 2.4 |
| Salt | 0.4 |
| Water | 55.4 |
| Peanut Oil | 16.3 |
| Apple Flavor (Naarden) | 0.3 |

Red Delicious apples are then cored and shredded with a Cuisinart ® food processor to shreds that are about 4 mm in diameter and about 3 cm in length to make about 240 grams of shreds. The shredded apple is combined with 620 grams of the pretreatment solution and allowed to soak for one hour. The shredded apple is then drained with a vacuum filter until negligible free solution remains on the surface of the shreds. The shredded apple is then combined with a foam component at a ratio of shreds to foam of 8 to 2.

| Foam Composition | |
| --- | --- |
| Ingredient | Wt. % |
| Polyglycerol Ester (PGE) | 0.7 |
| Water | 84.3 |
| Carboxymethylcellulose (CMC) | 0.7 |
| Pregelatinized Starch | 2.0 |
| Sucrose | 10.0 |
| Egg White Solids | 2.3 |

The foam is prepared by first combining the polyglycerol ester (PGE) and about 30% of the water, microwaving the solution to 92° C. and then cooling to 27° C. (80° F.). The CMC, pregelatinized starch and sucrose are then combined and mixed with a Kitchen Home Center on low speed until all lumps are gone. The remaining water is added to the dry mixture and mixed at low speed until combined then at speed 6 until smooth. The egg white solids are added and mixed until dissolved. The cooled PGE and water solution is then added to this mixture and blended first at speed 4 for about ½ minute, then at speed 6 for about 6 minutes, then at speed 8 for about 4 minutes, and finally at speed 6 again for about 2 minutes. The foam density should be about 0.24. Peanut butter paste is then folded into the foam mixture at the following ratio; foam to paste, 8.2 to 1.

The "wet" foam/shred composition is then shaped into balls using a size 100 cookie scoop. The balls are placed onto a Teflon ® coated, perforated screen. The products are dehydrated in a convection oven (Blue-M-Oven) for about 2 hours at 110° C. The snack products are removed to a rack to cool.

The final apple snack balls have an $A_w$ of about 0.08, and a bulk density of about 0.4. The snack balls have a fat content of about 15%. The apple shreds in each ball are positioned therein in a random uncollapsed open mat structure with a ratio of solids volume to total volume of about 0.6, which provides the product with a crisp, tender eating quality.

Substantially similar results are obtained if the apple flavor is replaced with other fruit flavors or nut flavors, such as pecan or almond flavor.

Substantially similar results are obtained if the peanut oil is replaced with Crisco brand oil (available from The Procter & Gamble Company) or other similar edible oils.

Substantially similar results are obtained if chopped or ground nuts are added to the foam/shred composition prior to dehydration.

What is claimed is:

1. A method for the manufacture of a snack product comprising the steps of:
   a. removing undesirable parts from whole pieces of edible plant matter;
   b. subdividing said pieces of plant matter into smaller pieces;
   c. pretreating said pieces with sugar until said pieces absorb from about 5% to about 25% of sugar by weight percent of said pieces;
   d. draining said pieces until dewatered;
   e. forming a mixture of said pieces with a foam composition so that the pieces to foam weight ratio is from about 2 to about 9;
   f. forming said mixture into the desired shaped product;
   g. drying said product at a temperature of from about 75° C. to about 120° C. for from about 60 minutes to about 250 minutes to a water activity of from about 0.05 to about 0.3 and a bulk density of from about 0.2 to about 0.6 so that said pieces substantially retain their original volume and said pieces are positioned with respect to one another in an open mat structure such that the snack product is characterized by a ratio of solids volume to total volume of from about 0.5 to about 0.85.

2. The method of claim 1 wherein the pieces of edible plant matter are selected from the group consisting of apple, carrot, beet and mixtures thereof.

3. The method of claim 1 wherein the pieces of edible plant matter are subdivided into shreds having a width of from about 1 mm to about 4 mm and a length of from about 2 cm to about 5 cm.

4. The method of claim 2 wherein the pieces of edible plant matter are subdivided into shreds having a width of from about 1 mm to about 4 mm and a length of from about 2 cm to about 5 cm, and, wherein said pretreating comprises soaking said pieces in an aqueous sugar solution wherein the weight ratio of pieces to solution is from about 1:1 to about 1:4.

5. The method of claim 4 wherein the pieces are soaked for from about 10 to about 60 minutes.

6. The method of claim 4 wherein the aqueous sugar solution comprises from about 5% to about 50% sucrose.

7. The method of claim 4 wherein the aqueous sugar solution additionally comprises from about 0.5% to about 2.5% by weight of an anti-browning agent.

8. The method of claim 4 wherein said aqueous sugar solution additionally comprises from about 2% to about 15% by weight of an edible oil.

9. The method of claim 2 wherein the pieces of edible plant matter are subdivided into shreds having a width of from about 1 mm to about 4 mm and a length of from about 2 cm to about 5 cm, and wherein said pretreating comprises direct sugaring wherein the weight ratio of pieces to sugar is from about 10:1 to about 4:1.

10. The method of claim 9 wherein said pretreating takes place for from about 4 to about 48 hours.

11. The method of claim 2 wherein said foam composition comprises from about 1.5% to about 8% by weight of a foaming agent, from about 0.5% to about 6% by weight of a foam thickening agent, from about 5% to about 55% by weight of a sugar component, and from about 45% to about 90% by weight water, and wherein the pieces of edible plant matter are subdivided into shreds having a width of from about 1 mm to about 4 mm and a length of about 2 cm to about 5 cm.

12. The method of claim 11 wherein the foaming agent is egg white solids.

13. The method of claim 11 wherein the foam thickening agent is pregelatinized starch.

14. The method of claim 11 wherein the sugar component of the foam is sucrose.

15. The method of claim 11 wherein said foam composition additionally comprises from about 20% to about 35% by weight peanut butter paste.

16. The method of claim 1 wherein said foam composition comprises a fat-containing whipped topping composition.

17. The method of claim 1 wherein the shaped product is a flat disc having a thickness of from about 0.5 cm to about 2 cm and a diameter of from about 3 cm to about 6 cm.

18. The method of claim 1 wherein the shaped product is a bite-sized ball having a diameter of from about 1 cm to about 2.5 cm.

19. The method of claim 17 wherein the product is dried between two perforated metal baking sheets.

20. The method of claim 18 wherein the product is dried on a single perforated metal baking sheet.

21. The method of claim 1 wherein the product is dried to a water activity of about 0.1.

22. The method of claim 21 wherein the product is dried to a bulk density of about 0.55.

23. A method for the manufacture of an apple snack product comprising the steps of:
  a. peeling and coring whole apples;
  b. shredding the peeled and cored apples of (a) into shreds having a width of from about 1 mm to about 4 mm and a length of from about 2 cm to about 5 cm;
  c. soaking said shreds for from about 10 to about 60 minutes at a temperature of from about 4° C. to about 35° C. in an aqueous sugar solution wherein the weight ratio of shreds to solution is from about 1:1 to about 1:4;
  d. draining said shreds until dewatered;
  e. forming a mixture of said pieces with a foam composition comprising from about 1.5% to about 8% of egg white solids, from about 0.5% to about 6% of pregelatinized starch, from about 5% to about 55% of sucrose, and from about 45% to about 90% water, so that the pieces to foam weight ratio is from about 2 to about 9;
  f. forming said mixture into flat discs having a thickness of from about 0.5 cm to about 2.0 cm and a diameter of from about 3 cm to about 6 cm;
  g. drying said discs between two perforated metal baking sheets at a temperature of from about 75° C. to about 120° C. for from about 60 minutes to about 250 minutes to a water activity of from about 0.05 to about 0.3 and a bulk density of from about 0.2 to about 0.6 so that said pieces substantially retain their original volume and said pieces are positioned with respect to one another in an open mat structure such that the snack product is characterized by a ratio of solids volume to total volume of from about 0.5 to about 0.85.

24. The product of the process of claim 2.

25. The product of the process of claim 23.

26. A dried snack product, having a water activity of from about 0.05 to about 0.3, and a bulk density of from about 0.2 to about 0.6, which comprises:
  a. from about 40% to about 70% subdivided pieces of dried edible matter;
  b. from about 5% to about 50% by weight added sugar absorbed into said subdivided pieces;
  c. from about 10% to about 40% by weight of a collapsed foam coating the exterior of said pieces;
  d. from about 2% to about 30% of peanut oil; and
wherein said pieces substantially retain their original volume and said pieces are positioned with respect to one another in a random open mat structure such that the snack product has a ratio of solids volume to total volume of from about 0.5 to about 0.85.

27. The snack product of claim 26 wherein said collapsed foam comprises from about 40% to about 80% of sugar; from about 10% to about 30% of a foaming agent; and from about 10% to about 30% of a foam thickening agent.

28. The snack product of claim 27 wherein said foam thickening agent is pregelatinized starch and wherein said edible plant matter is selected from the group consisting of fruits, vegetables and mixtures thereof.

29. The snack product of claim 27 wherein said sugar comprises sucrose.

30. The snack product of claim 28 in the form of a flat disc having a diameter of from about 3 cm to about 6 cm, and a thickness of from about 0.5 cm to about 2.0 cm.

31. The snack product of claim 28 in the form of a ball having a diameter of from about 1.0 cm to about 2.5 cm.

32. A snack product comprising two discs according to claim 30 and a edible filling positioned between the two discs.

33. The snack product of claim 32 wherein the filling is selected from the group consisting of frosting, fruit paste, peanut butter, and cheese.

34. A snack product in the form of a flat disc, having a water activity from 0.05 to about 0.3, and a bulk density of from about 0.2 to about 0.6, which comprises:
  a. from about 40% to about 70% by weight of vegetable matter selected from the group consisting of dried shredded apple, dried shredded carrot, dried shredded beet, and mixtures thereof;
  b. from about 5% to about 60% by weight of added sugar absorbed in said vegetable matter;
  c. from about 5% to about 40% by weight of added sugar coating the exterior of said vegetable matter;
  d. from about 2% to about 10% by weight of egg white solids coating the exterior of said vegetable matter;
  e. from about 1% to about 6% by weight of polyglycerol ester coating the exterior of said vegetable matter; and
  f. from about 2% to about 10% by weight of pregelatinized starch coating the exterior of said vegetable matter;
wherein said shreds substantially retain their original volume and said shreds are positioned with respect to one another in a random open mat structure such that the snack product has a ratio of solids volume to total volume of from about 0.5 to about 0.85.

35. An apple snack product in the form of a bite-sized ball, having a water activity of from about 0.05 to about 0.3 and a bulk density of from about 0.2 to about 0.6, which comprises:
  a. from about 40% to about 70% by weight dried shredded apples;
  b. from about 5% to about 60% by weight of added sugar absorbed into said shredded apples;
  c. from about 5% to about 40% by weight of added sugar coating the exterior of said shredded apples;
  d. from about 2% to about 10% by weight of egg white solids coating the exterior of said shredded apples;
  e. from about 1% to about 6% by weight of polyglycerol ester coating the exterior of said shredded apples; and
  f. from about 2% to about 10% by weight of pregelatinized starch coating the exterior of said shredded apples;
wherein said shreds substantially retain their original volume and said shreds are positioned with respect to one another in a random open mat structure such that the snack product has a ratio of solids volume to a total volume of from about 0.5 to about 0.85.

* * * * *